Sept. 7, 1926.
L. A. BALDWIN
1,599,109
TANK COVER
Filed July 15, 1925
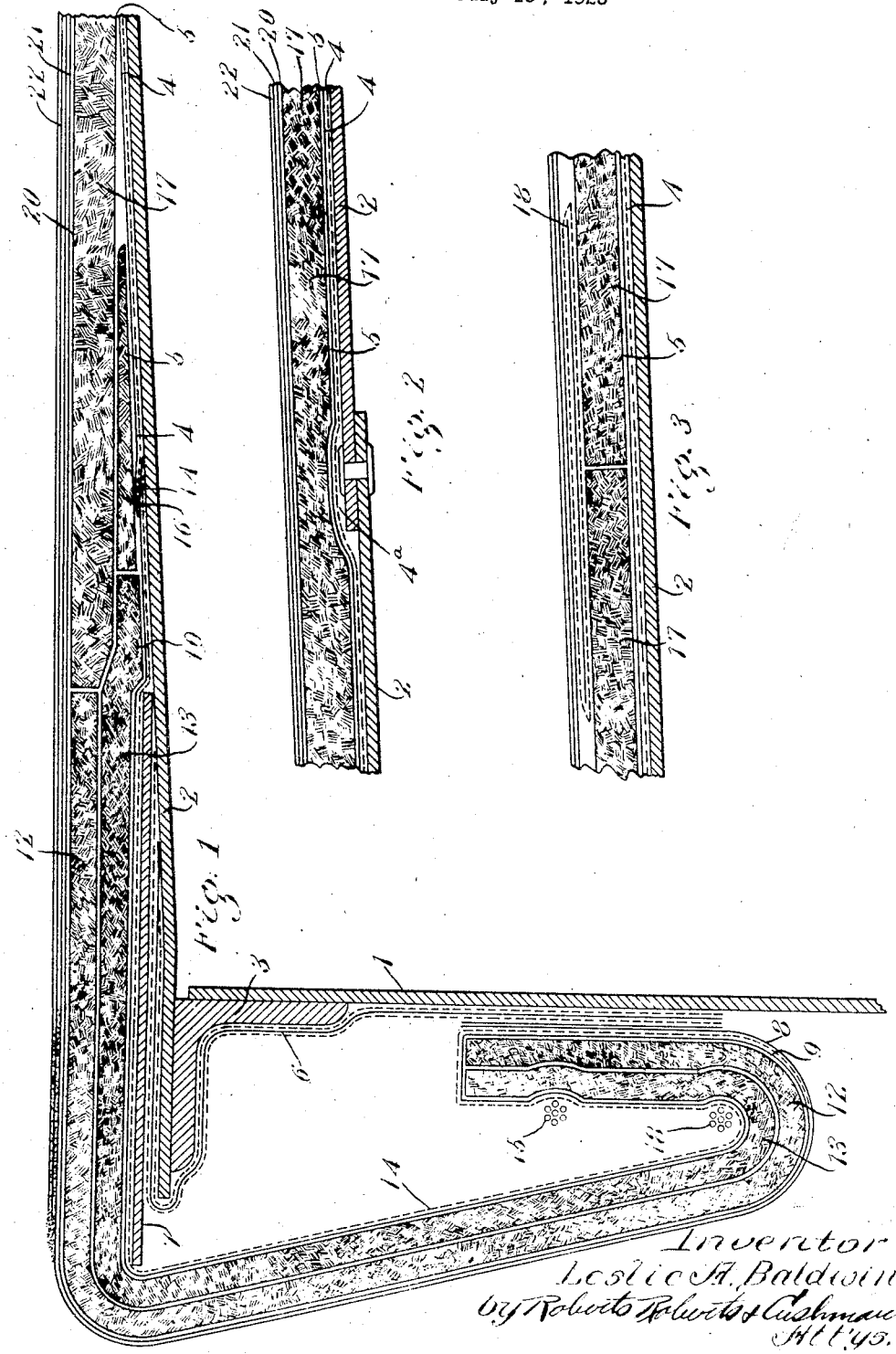
Inventor
Leslie A. Baldwin
by Roberts Roberts & Cushman
Attys.

Patented Sept. 7, 1926.

1,599,109

UNITED STATES PATENT OFFICE.

LESLIE A. BALDWIN, OF UNIVERSITY CITY, MISSOURI, ASSIGNOR TO JOHNS-MANVILLE, INCORPORATED, OF NEW YORK, N. Y., A CORPORATION OF NEW YORK.

TANK COVER.

Application filed July 15, 1925. Serial No. 43,754.

My invention relates to covers for tanks in which volatile liquids such as petroleum, are stored. In order to serve its purposes completely, the cover for such a tank should be gas tight and weather-proof, capable of adapting itself to or of compensating for, the irregular and persistent expansion and contractions of the tank and its roof; an effective heat insulator so as to minimize fluctuations of temperatures of the gases which collect by volatilization of constituents of the liquid in the tank; and, to the same end, should have an upper exposed surface strongly reflective of heat so as to reduce the quantity of heat absorbed by the covering layers and transmitted to the interior of the tank.

The weather-proofing of a tank cover must be of sheet-roofing with seams cemented by weather-resistant material; practically this requirement leaves no alternative and dictates the employment of asphalt-treated or impregnated sheets of fibrous textile or felted material, (preferably the latter) in which the asphalt impregnant is the effective weather-proofing factor. This being the case, the importance of preventing access to the asphaltic material by the volatile constituents of petroleum and the like, which have a vigorous disintegrating effect on asphalt, becomes obvious. And, when the inevitable expansions and contractions of the roof and sides are taken into calculation, the difficulty of providing a vapor-proof layer or membrane which shall retain its integrity and effectively endure to forbid the percolation of asphalt-deteriorating vapors into the weather-proofing asphaltic layer of a tank cover, becomes manifest.

The improvements in tank covers herein described are addressed to this situation.

Usually, a membrane or coating designed to oppose passage of a fluid is placed at the threshold—so to speak—of the passage to be barred. On the contrary, in the circumstances presented by the petroleum tank and its environing conditions, I place a sealing layer or membrane (or both) in which ultimate reliance is reposed, as far as possible from the tank-roof and its volatile contents, taking the fullest available advantage of the cushioning effect of the heat-insulating layers which form part of the tank covering, and requiring them to perform a function other than, or supplemental to, their heat insulating function. Also, and by strong preference, I employ for the vapor sealing material a vapor resistant cement which is to a substantial degree elastic at the temperature of its use, as well as plastic at higher temperatures, and liquefiable at higher temperatures still, as constrasted with materials which harden and become brittle. For example, I have found by test and practice, that a composition like that of printer's ink rolls (glue and glycerine, glue and molasses, glue and glycerine with minor proportions of varnishes, etc.) is an effective cementitious material for my purpose, either when laid as a cementitious coating, or used to impregnate a fibrous sheet such as paper and thus to form a vapor-proof membrane.

The elasticity of such a cement renders it useful and effective to form an auxiliary protective layer or seal, either as a coating or a constituent of a membrane, in a level or stratum of the tank covering nearer to the vapor content of the tank than the preferred outermost location above referred to; either between laminæ of the heat insulating material, or directly on the tank roof. Since a maximum of preventive measures against deterioration of the asphaltic weather-proofing material is wholly to be desired, I prefer to employ this elastic, vapor-proof cementitious material both in the outermost stratum of the tank covering, inside the weather-proofing, and, as a primary vapor-seal, at a stratum inside the said outer stratum.

And, although the yielding and cushioning effect of the heat-insulating layers of material reduces the demand for elasticity on the part of the vapor sealing layer or membrane (or both) which is superposed on the heat insulating layer, it is nevertheless preferable to have such vapor-proofing layer possess elasticity as an element of insurance.

I have alluded to the cushioning effect of the heat-insulating layers in the tank cover. This effect or function, invoked and availed of in the relationship with a vapor sealing layer superposed on the heat insulating material, is one which any true heat-insulator will perform. The only real heat-insulator known is gas (air) in a state of rest. Cellular, reticulated, or felted bodies contain a multitude of air-filled spaces, each so small that convective currents therein are negligible, are therefore good insulators. Such a body necessarily is far from rigid as a whole, and therefore possesses the essential structural characteristics of a cushion. This is especially true of the felted materials extensively used as heat-insulating layers upon petroleum tank roofs.

Thus, if the primary vapor seal provided by a layer or pellicle of elastic vapor-proof cement laid upon or close to the tank roof should under unusual stresses become fractured, these stresses will be in large measure absorbed by the cellular or porous heat-insulating portions of the tank cover, and the outer ultimate vapor sealing layer of similar elastic material, always in reserve against such emergency will have remained unbroken and in full capacity to perform its function of keeping tank vapors away from the asphaltic weather-proofing material at the top of the tank covering.

While the cementitious material above named, viz, a composition of glue with glycerine, molasses, etc., is, by reason of its elasticity to be preferred over other vapor-proof, pellicle-forming materials, others may be effectively employed, especially when laid upon and cushioned by a heat insulating layer and thereby not subjected to such stresses as must be sustained by a vapor-proof, cementitious layer applied directly to the tank roof itself. Among substitutes for the elastic cement specifically recommended, may be mentioned polymerized oils, blown or boiled drying oils, and even such materials as sodium silicate, which may be used with a large measure of confidence if cushioned as by a felt heat insulating foundation.

The principles of construction above generally outlined are illustrated in the accompanying drawings, in which:—

Fig. 1 is a vertical section representing a typical application of the invention to an oil storage tank having a plate metal roof;

Fig. 2 is a vertical section at one of the joints between the roof plates; and

Fig. 3 is a detail vertical section at one of the joints between adjacent sheets of insulation material.

The tank siding 1 has, as usual, an eave-angle iron 3, on which rests the roof plate 2. The major part of the tank roof is covered with sheets of heat insulating felt 17, a material which, as an incident to its interstitial structure and constituent interlaced fibres, is yielding and elastic to a marked degree.

The weather-proofing covering, in the preferred construction here shown, consists of two layers (preferably each of double or triple lamination) 21 and 22 of asbestos roofing felt or paper, each layer being impregnated with asphaltic material at one side, and having a light colored, heat reflecting, unimpregnated layer on the other side. This unimpregnated layer is bibulous or absorbent, and thus well adapted to unite with a liquid cementitious material.

In the preferred form of tank covering here shown, by which a large measure of insurance against vapor percolation is provided, the tank roof plating is first coated with a base layer 4 of substantial thickness— say ⅛ inch—of normally elastic, petroleum-vapor-resistant cement, such as the typical glue-glycerine composition above mentioned, this coating, laid or flowed on while hot, being built up and smoothed over the laps and rivets, as at 4ª (Fig. 2) so as to provide a continuous smooth surface, free from abrupt steps or jogs. This base coating, laid while hot and fluid, is elastic at ordinary atmospheric temperatures, and, since it assumes a viscous fluidity under very hot weather conditions, is least liable to fracture at times of expansions of the tank roof.

For further protection, and for reinforcement of the base layer of cement, a layer 5 of porous material such as paper (red rosin paper is well adapted to the purpose) well coated on both sides with vapor-proof cement, and thereby adhesively secured to the base layer of similar cement, is recommended.

Over the primary vapor-sealing layer of cement, or cement and vapor-proofed membrane, there is laid the heat insulating covering 17; this being a thick felt of any approved fibrous material or mixture, such as cattle hair, asbestos fibre, wood or other vegetable fibres, wool, etc. This felt should be laid on the vapor-proof cement layers, or the superposed cement coated membrane while the cementitious material is sufficiently fluid to be enmeshed in the surface of the felt, which is thus adhesively secured to the material beneath it, and to the roof of the tank. Points between adjacent sheets of the felt layer 17 may be covered by strips 18 (Fig. 3) of heavy paper, or cloth, preferably well coated and impregnated with vapor-proof cement.

When the heat insulating layer 17 is in place, a coating of vapor-proof cement is spread upon it, covering the sheets and joint strips 18. This coating, if not too freely fluid, may be flowed upon the porous heat insulating material and will be held in the superficial region thereof without undue penetration into its body, forming a continuous pellicle. Or, the vapor-proof cement may be first applied to porous sheets in a thick layer and these sheets laid upon the heat insulating material. The layer marked 20 in the drawings represents this covering pellicle of vapor-proof cement, in either form.

The preferred weather-proof top covering consists of two layers of asbestos paper or felt, impregnated with asphalt from one side, the lamina of paper at the other side being adhesively secured to the impregnated laminæ by means of the asphalt, but left for the most part unimpregnated, so that it remains in a bibulous or absorbent condition. One such multiple or laminated sheet (21) is laid with its absorbent face down, and resting on the vapor-proof, cement layer 20, to which, by the application of heat, or merely by pressure contact, it is made to adhere. The other roofing sheet 22 is then laid with its asphalted surface down, upon the exposed asphalted surface of the sheet 21, hot asphalt being mopped on during the process, as is usual in the assembling of asphalted asbestos roofing sheets.

The same principles of construction as above described in respect to the major portion of the tank top hold good for the special covering construction required for the periphery of the tank top. An inner seal is made at the edge of the tank top by applying strips of fabric or felt or paper, well coated on both sides with the vapor-proof cement, these strips 6, being adhesively applied to the upper side of the tank cover 2 near the rim thereof, carried over the rim and the supporting angle irons 3, and laid against the tank side 1, to which these strips adhere. The inner sealing strip 6 (Fig. 1) is shown as wrapped closely over the rim of the tank cover 2 and adhesively attached to the eaves angle 3; it may, however, be allowed to hang unattached to the angle 3, so as to provide slack to be taken up if the tank top should shift outwardly in relation to the tank side.

Eave strips 7, of sheet material, metal, mill board, etc., are laid over the sealing strips 6, and project radially so as to afford support for the outer sealing covering and hold it spaced slightly from the periphery of the tank top itself.

The outer sealing covering comprises heat insulating felt layers 12 and 13 to which are cemented paper or other flexible sheets 9 and 14, each thoroughly coated on both sides with the vapor-proof elastic cement. For further protection of this outer seal, a sheet 8 of asphalt-impregnated cloth, felt, or asbestos paper is laid on, and cemented to, the vapor-proofed membrane 9.

This composite protective covering is lapped over the lower edge of the inner seal 6, and firmly bound to the tank side by means of wire cable ties 15 and 8, which embrace the entire periphery of the tank side and may be set tight by means of turnbuckles. Then the composite covering is folded upward and over the edge of the tank top. Preferably, the felt layer 13 is so proportioned as to project within the layer 12, and the vapor-proof membrane 14 likewise made so as to project inward upon the tan tops. Gusset strips 16 of tapered section, composed preferably of heat-insulating felt, may be laid inside the layers 13, so as to form therewith an even-surfaced base over which to lap the first course of the felt covering 17. It will be found advisable to spread a layer of the vapor-proof cement over the eaves strips 7 and the adjoining outer surface of the tank top before the outer surface of the tank top before the outer surface seal is folded into place, so that the cemented membrane 10 may be well secured. This membrane may be butted against or lapped under the similar membrane 5, if such be used.

The cement layer 20, either as a skin of vapor-proof cement or as a cemented membrane, with weather-proofing sheets 21 and 22, will be laid to or lapped over, the outer coverings of the felt sheets 12, 13.

I claim:—

1. The combination, with the roof of an oil tank or like structure, liable to appreciable distortion under temperature variations, of a covering comprising an elastic felted heat insulating layer overlying said roof, and an oil-vapor proof layer overlying said felted layer, the felted layer serving as a cushion to reduce the effect of distortions of the roof on the vapor-proof layer.

2. The combination, with the roof of an oil tank or like structure, liable to appreciable distortions under temperature variations, of a covering comprising an elastic felted heat insulating layer overlying said roof, and an oil-vapor proof layer overlying said felted layer, the felted layer serving as a cushion to reduce the effect of distortions of the roof on the vapor-proof layer, and a weather proof layer overlying said vapor proof layer to protect the latter against disintegration by water.

3. The combination, with the roof of an oil tank or like structure, liable to appreciable distortion under temperature variations, of a covering comprising an elastic felted heat insulating layer overlying said roof, and an elastic oil-vapor proof layer overlying said felted layer, the felted layer serving as a cushion to reduce the effect of distortions of the roof on the vapor-proof layer.

4. The combination, with the roof of an oil tank or like structure, liable to appreciable distortion under temperature variations, of a covering comprising an elastic felted heat insulating layer overlying said roof, and an elastic oil-vapor proof layer overlying said felted layer, the felted layer serving as a cushion to reduce the effect of distortions of the roof on the vapor-proof layer, and a weather proof layer overlying said vapor proof layer to protect the latter against disintegration by water.

5. The combination, with the roof of an l tank or like structure, liable to appreciable distortion under temperature variations, of a covering comprising an elastic oil-vapor proof layer overlying the roof, an elastic felted heat insulating layer overlying said vapor proof layer, and a second oil vapor proof layer overlying said felted layer, the felted layer serving as a cushion to reduce the effect of distortions of the roof on the vapor proof layer overlying it.

6. The combination, with the roof of an oil tank or like structure, liable to appreciable distortion under temperature variations, of a covering comprising an elastic oil-vapor proof layer overlying the roof, an elastic felted heat insulating layer overlying said vapor proof layer, and a second oil vapor proof layer overlying said felted layer, the felted layer serving as a cushion to reduce the effect of distortions of the roof on the vapor proof layer overlying it, and a weather proof layer overlying said vapor proof layer to protect the latter against disintegration by water.

Signed by me at St. Louis, Missouri this eighth day of May 1925.

LESLIE A. BALDWIN.